(12) United States Patent
Alexandersen

(10) Patent No.: US 8,136,313 B2
(45) Date of Patent: Mar. 20, 2012

(54) LINOLEUM COVERED PLATE WHERE THE EDGE OF THE PLATE IS COVERED WITH LINOLEUM BAND WITHOUT BASE

(75) Inventor: Arne Alexandersen, Randers (DK)

(73) Assignee: WO Production ApS, Randers (DK)

( * ) Notice: Subject to any disclaimer, the term of this patent is extended or adjusted under 35 U.S.C. 154(b) by 88 days.

(21) Appl. No.: 12/601,735

(22) PCT Filed: May 23, 2008

(86) PCT No.: PCT/DK2008/000194
§ 371 (c)(1),
(2), (4) Date: Nov. 24, 2009

(87) PCT Pub. No.: WO2008/141648
PCT Pub. Date: Nov. 27, 2008

(65) Prior Publication Data
US 2010/0170193 A1    Jul. 8, 2010

(30) Foreign Application Priority Data
May 24, 2007  (DK) ................................ 2007 00761

(51) Int. Cl.
*E04F 11/16* (2006.01)
*E04F 15/00* (2006.01)
*E04G 23/00* (2006.01)

(52) U.S. Cl. ............................ 52/179; 52/177; 52/745.2

(58) Field of Classification Search .................... 52/179, 52/177
See application file for complete search history.

(56) References Cited

U.S. PATENT DOCUMENTS
3,586,556 A * 6/1971 Clark et al. ................... 156/79
5,569,505 A   10/1996 Nichols
2003/0196762 A1  10/2003 Collison et al.

FOREIGN PATENT DOCUMENTS
DE  29611931 U   9/1996
DE  29701423 U   5/1997
GB    500917 A   2/1939
JP   09161971   * 6/1997

* cited by examiner

*Primary Examiner* — Mark Wendell
(74) *Attorney, Agent, or Firm* — Roberts Mlotkowski Safran & Cole, P.C.; David S. Safran

(57) ABSTRACT

A method where linoleum with a base is introduced in an apparatus, the linoleum conveyed on a working surface and advanced against a cutting edge, the cutting edge being arranged such that the linoleum, while moving in the apparatus, is separated from the base. By this method, an even back side is achieved on the linoleum band, making the band suited for further processing since no irregularities appear on the back side where the base is removed, and the front side is without any damages and scratches from the process. Linoleum from which the base has been removed according to this method contributes to a good finish on the produced linoleum covered edge, since the even back side propagates to the front side of the linoleum covered plate edge, which then appears even and has a good aesthetic effect, making it attractive.

11 Claims, 1 Drawing Sheet

LINOLEUM COVERED PLATE WHERE THE EDGE OF THE PLATE IS COVERED WITH LINOLEUM BAND WITHOUT BASE

BACKGROUND OF THE INVENTION

1. Field of the Invention

The present invention relates to method for complete or partial removal of the base of ready-made linoleum, preferably on linoleum band with a width which is less than the length, and a method, a product and use of linoleum covering on a plate where one of the edges of the plate is directly or indirectly covered with linoleum band, wherein the base is removed.

2. Description of Related Art

It is commonly known to cover surfaces with linoleum, providing a hard-wearing, antistatic, noise attenuating, heat resistant, dust and germ repelling surface, which additionally is so flexible that minor scratches occurring the linoleum surface will fade over time. Linoleum is often used, for example, for tabletops and floors.

Linoleum is known as a natural product consisting of an oxidized mixture of linseed oil and resin with added limestone, dye, wood flour and/or cork dust. During production of linoleum, this linoleum mass is typically applied to a base of jute or cardboard, and the linoleum mass is rolled in a compression rolling mill under heat and pressure into a form of elongated webs that are stored in rolls after hardening, the rolls are typically provided in standard widths, or punched into linoleum tiles in standard sizes.

By using linoleum for covering furniture and other interior objects, such as tabletops and window sills, there is a need for plate edges appearing with the same color and sheen as the plate surface itself. For this purpose, the plate edge has often been ground and painted, which, however, rarely produces the right finish, as one may see and feel the difference between the painted edge and the linoleum surface.

Furthermore, it has been attempted to apply linoleum at the edge of the linoleum covered plate. This has entailed edge solutions wherein the base becomes visible, which is not visually and aesthetically attractive at all. Moreover, action by moisture and temperature by the surroundings on the accessible base will in time cause that the linoleum come loose from the base, as base and linoleum have different coefficients of expansion.

By these experiments with linoleum covered plate edges, it has been attempted to remove the base on the linoleum by various methods. For example, the linoleum has been put into water for softening the base so that it was easier to tear or rub off. This solution, however, has most often caused damage at the front side of the edge band and left irregularities with base residue at the back side, and when the back side of the edge band is uneven, the corresponding unevenness will be transmitted to the front side of the ready-made bonded edge band and give a bad finish to the linoleum covered plate edge. Moreover, the process is demanding time and manpower and therefore cost-heavy.

It is also well-known to grind the base off, either by sandpaper or a smoothing machine. This solution often causes scratches at the front side of the linoleum band, since the linoleum band is easily displaced, in spite of attempts to fix it during the grinding process. The process is also time and manpower demanding and therefore cost-heavy.

SUMMARY OF THE INVENTION

The invention concerns a method where linoleum with a base is introduced in an apparatus, where the linoleum is conveyed on a working surface, where the linoleum is advanced by means adapted therefore against a cutting edge, wherein the cutting edge is arranged such that linoleum while moving in the apparatus is separated from the base.

By this method is achieved an even back side on the linoleum band, making the band suited for further processing since no irregularities appear on the back side where the base is removed, and the front side is without any damages and scratches from the process. Linoleum band having removed the base according to this method contributes to a good finish at the produced linoleum covered edge, since the even back side is propagated to the front side on the linoleum covered plate edge, which then appears even and with good aesthetic effect, making it attractive. Furthermore, a greater flexibility of the linoleum may be achieved when the base is removed, since a thinner plate material has a smaller radius of curvature before breaking than a thicker plate material. Edge roundings can be made with lesser radius without removing the possibility of covering the rounded edge with linoleum.

The linoleum may be advanced on the working surface by at least one drive roller, wherein the movement of the linoleum occurs continually. By using a roller for moving the linoleum band, there is achieved greater safety against scratches, wear or grind marks appearing on the linoleum band after removing the base. By continuous movement it is ensured that no marks or other irregularities appear in the linoleum band resulting from actions of stop and start in the production process. For retaining the linoleum band at the right position in the production process, a retainer roller may be used, where similarly to using a drive roller there is achieve greater certainty against scratches, wear or grind marks appearing on the linoleum band after removing the base.

If a step-by-step process is performed, possible unevenesses caused by start and stop of the production process may be used for forming a pattern of irregularities which may be aesthetically attractive and thereby utilised in connection with the sale of products made by this process.

The linoleum mounted on the face of the plate may be with a base, where the edges of the plate are mounted directly or indirectly with linoleum, where the base is removed by the method mentioned above. By using linoleum with base on a larger surface there is provided great certainty for the finished surface appearing even and uniform.

The edges of the plate may be covered directly by linoleum such that the edge covering is constituted by linoleum, where the base is removed. Hereby is achieved, as previously mentioned, a more flexible edge covering as the linoleum edge band without base has a smaller bending radius than a linoleum edge band with base. For example, edge roundings can be made with lesser radius providing fewer limits to the design of installation or building parts to be covered with linoleum.

The edges of the plate can be covered indirectly by linoleum such that the edge covering is constituted by an edge profile, where the edge profile is covered by linoleum, where the base is removed. By pre-fabricating linoleum-covered edge profiles, there is possibility of ensuring a perfect mounting of linoleum bands on the mouldings in a rational way, whereby a possibility of rationalising the production is achieved. This may entail a more competitive solution with regard to price and delivery compared with the prior art methods for covering and finish on linoleum-covered plate edges.

Linoleum on the face of the plate and linoleum on the edges of the plate may be made of linoleum from one linoleum mixture which is processed to linoleum in one and the same process. By this embodiment is achieved a completely uniform solution with regard to colour, where the linoleum-covered plate face and linoleum-covered edge are without the colour shade differences that otherwise may appear if linoleum from various linoleum mixtures/production processes is used.

The surface of the plate is covered with linoleum with a base, where the base is covered directly or indirectly by the edge covering on the plate, where the edge covering is made with linoleum without a base. By hiding the base of the linoleum of the surface in the final edge covering in this way, there is achieved a desired aesthetic edge solution and action by moisture and temperature will only to a minor extent reach the base, providing a great certainty against the base of the face for linoleum will not come loose as a result of these actions.

The plate may be used in the production of linoleum-covered installations and/or building parts. Besides a wider scope of possibilities in the design of linoleum-covered objects, there is also achieved that the formerly described rationalising profits will provide a better profitability for linoleum-covered installations and/or building parts. This provides possibility for a greater market share for linoleum-covering compared with surface coatings which are not as environment-friendly as linoleum. Since linoleum, as mentioned in the introduction, is a natural material which is hard-wearing, antistatic, noise attenuating, heat resistant, dust and germ repelling, a better profitability in using the material will provide for the good properties coming to the benefit of even more people.

The invention is described in more detail with reference to the drawing,

DETAILED DESCRIPTION OF THE INVENTION

Figure 1:
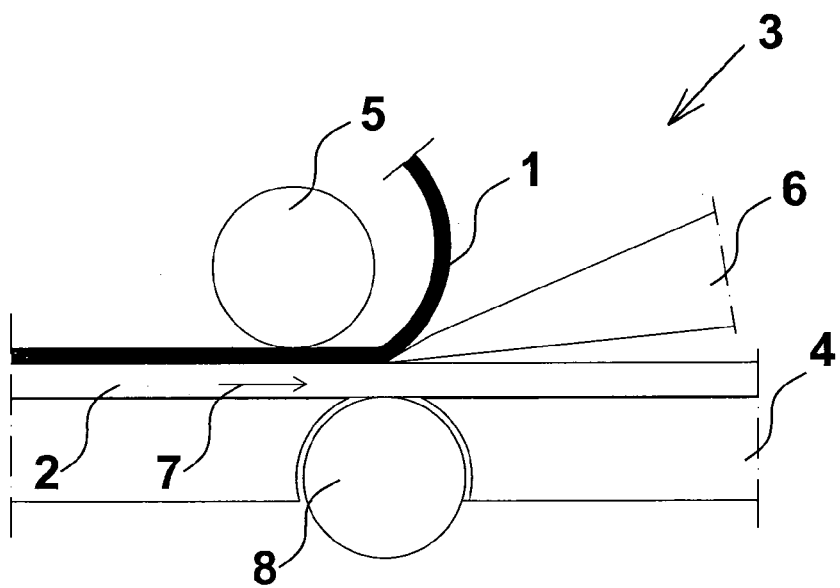
FIG. 1 shows the principle of the method of removing a base.

FIG. 1 is an elementary drawing of an apparatus for removing the base 1 on a band ready-made linoleum 2. Linoleum 2 with a base 1 is introduced into an apparatus 3, where the linoleum 2 is conveyed on a working surface 4, where the linoleum is advanced against a cutting edge 6 by means of a drive roller 5, wherein the cutting edge 6 is arranged such that linoleum 2, while moving in a direction 7 in the apparatus 3, is separated from the base 1. The linoleum 2 is retained at the desired position by means of a retainer roller 8.

Figure 2:
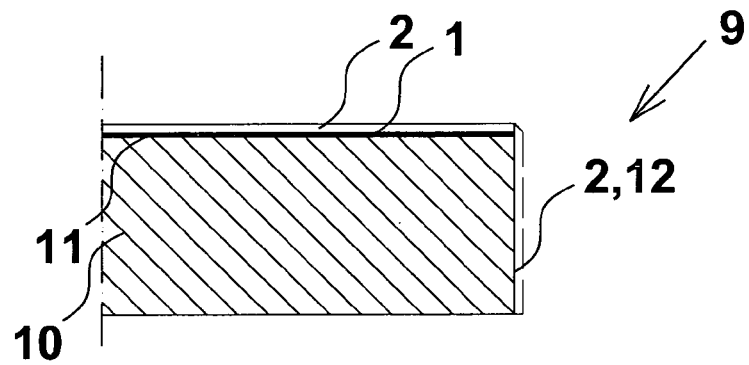
FIG. 2 shows a straight edge solution where the base is covered by an edge covering without a base.
Figure 3:
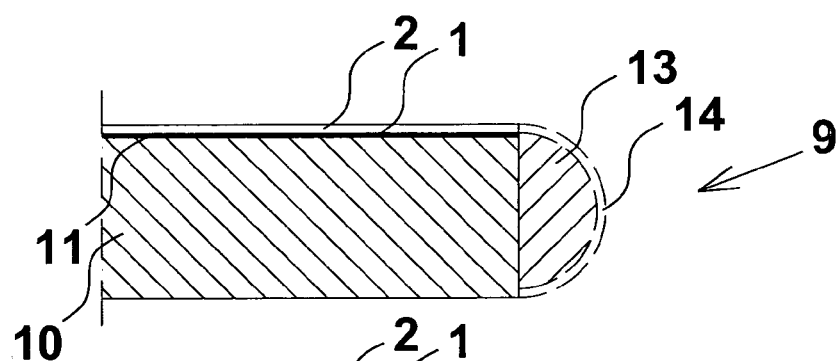
FIG. 3 shows a rounded edge solution where an edge profile is glued to a plate edge.
Figure 4:
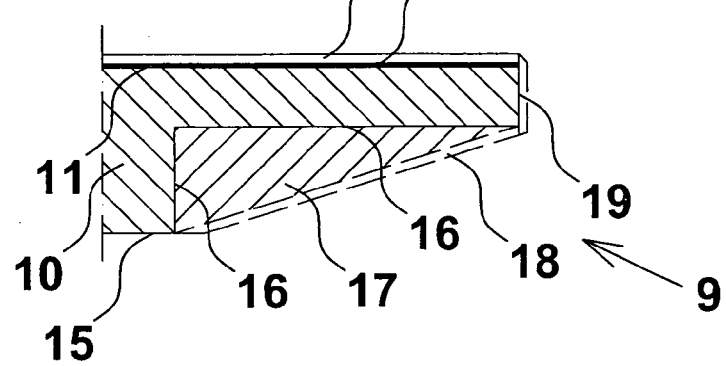
FIG. 4 shows a 135° edge solution with use of both edge profile and edge covering.

FIGS. 2-4 show three edge solutions with a linoleum-covered plate edge 9.

A plate edge 9 may, as shown on FIG. 2, be made by a rectangular cut. The plate 10 has a surface 11 which is covered by linoleum 2 with a base 1, where the base 1 is covered directly by the edge covering 12 on the plate 10, where the edge covering 12 is made with linoleum 2 without a base.

As shown on FIG. 3, a plate edge 9 can be made by a rectangular cut and an edge profile 13 fitted thereon. Here, the plate 10 also has a surface 11 which is covered by linoleum 2 with a base 1, where the base 1 is covered by the edge profile 13 and its covering 14, which is made with linoleum 2 without a base.

In FIG. 4, a plate 10 with a surface 11 covered by linoleum 2 with base 1 is shown. The plate 10 has been provided with a cutout 16 at the uncovered side 15. An edge profile 17 is mounted in the cutout 16 and covered at a side 18 by linoleum 2 without base. The rectangular cut in the plate 10 edge 19 is then covered by linoleum 2 without base covering the base 2 on the plate surface 11.

By these different embodiments/principles there is achieved the possibility of making linoleum-covered plates and plate edges in many ways with a plurality of degrees of freedom. The shown variants are not limiting to the scope of the invention, but are only examples of how the invention can be practiced, as a person skilled in the art will be able to apply the invention in many other ways and in several other variants after reading the present description.

The invention claimed is:

1. A method for complete or partial removal of the base of ready-made linoleum, wherein linoleum with a base is introduced into an apparatus, where the linoleum is conveyed on a working surface, where the linoleum is advanced, by means adapted therefore, against a cutting edge at a cutting position, wherein the cutting edge is arranged such that linoleum while moving in the apparatus is separated and removed from the base while the linoleum is retained at the cutting position by a retainer roller, as the linoleum separated from the base continues to be advanced on the working surface.

2. Method according to claim 1, wherein the linoleum is advanced on the working surface by at least one drive roller, wherein the movement of the linoleum occurs continually.

3. A method according to claim 2, wherein said at least one drive roller is arranged to advance said linoleum between said cutting edge and said retainer roller, the at least one drive roller being offset relative to the retainer roller in a direction opposite the direction in which the linoleum is advanced.

4. A method for linoleum covering at least one surface on a plate, where the edges of the plate are also directly or indirectly covered by linoleum, wherein the method comprises the step of providing linoleum having a base layer, wherein the linoleum is mounted on a face surface of the plate with the base layer against the surface, where the edges of the plate are mounted directly or indirectly with linoleum, where the base layer is removed from a portion of the linoleum by the method according to claim 1, said portion then being used to cover at least an edge portion of the plate.

5. Method for linoleum covering according to claim 4, wherein the edges of the plate are covered with linoleum where the base is removed.

6. Method for linoleum covering according to claim 4, wherein the edges of the plate are fitted with an edge profile, where the edge profile is covered with linoleum, where the base is removed.

7. Method for linoleum covering according to claim 4, wherein the linoleum on the face surface of the plate and the linoleum on the edge portion of the plate are made of linoleum manufactured from the same linoleum manufacturing process.

8. A method according to claim 4, wherein said plate is a wooden plate.

9. A method according to claim 1, wherein the method comprises the further steps of providing said cutting edge adjacent a first side of said linoleum to separate said linoleum from said base, and providing said retainer roller adjacent a second side of said linoleum that is on an opposite side of said linoleum from said first side.

10. A method according to claim 9, wherein the step of providing said retainer roller comprises locating said retainer roller on the working surface opposite said cutting edge.

11. A method according to claim 1, wherein said method is performed on linoleum in the form of a band that is longer than it is wide.

* * * * *